US012767486B2

(12) United States Patent
Saito et al.

(10) Patent No.: US 12,767,486 B2
(45) Date of Patent: Oct. 20, 2026

(54) OPERATION CONFIRMATION DEVICE AND OPERATION CONFIRMATION METHOD FOR ELECTRIC ACTUATOR FOR EMERGENCY STOP DEVICE

(71) Applicant: Hitachi, Ltd., Tokyo (JP)

(72) Inventors: Yuki Saito, Tokyo (JP); Yasushi Ito, Tokyo (JP); Yosuke Kubo, Tokyo (JP); Akira Iwamoto, Tokyo (JP); Hiroki Matsuura, Tokyo (JP); Hiroyuki Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 422 days.

(21) Appl. No.: 18/697,592

(22) PCT Filed: Oct. 7, 2021

(86) PCT No.: PCT/JP2021/037199

§ 371 (c)(1),
(2) Date: Apr. 1, 2024

(87) PCT Pub. No.: WO2023/058199

PCT Pub. Date: Apr. 13, 2023

(65) Prior Publication Data

US 2024/0327167 A1 Oct. 3, 2024

(51) Int. Cl.
*B66B 5/00* (2006.01)

(52) U.S. Cl.
CPC .......... *B66B 5/0093* (2013.01); *B66B 5/0031* (2013.01)

(58) Field of Classification Search
CPC ....... B66B 5/00; B66B 5/0031; B66B 5/0093; B66B 1/34; B66B 5/02; B66B 1/46; G01P 3/42; G05B 23/02
See application file for complete search history.

(56) References Cited

U.S. PATENT DOCUMENTS 7,918,320 B2 * 4/2011 Kondo .................. B66B 5/0031 187/288
11,383,957 B2 * 7/2022 Kattainen ............... B66B 5/027
(Continued)

FOREIGN PATENT DOCUMENTS

CN 105329737 A 2/2016
JP 7-2441 A 1/1995
(Continued)

OTHER PUBLICATIONS

International Search Report (PCT/ISA/210) issued in PCT Application No. PCT/JP2021/037199 dated Dec. 14, 2021 (2 pages).
(Continued)

*Primary Examiner* — Shawki S Ismail
(74) *Attorney, Agent, or Firm* — Crowell & Moring LLP

(57) ABSTRACT

Provided is an operation confirmation device for an electric actuator for an emergency stop device that can improve maintainability of an electric device portion. The operation confirmation device for the electric actuator for the emergency stop device confirms operation of an electric actuator (10). The electric actuator actuates a drive mechanism that drives the elevator emergency stop device, and includes a movable element (34*a*, 34*b*, 34*c*) mechanically connected to the drive mechanism, an electromagnet (35*a*, 35*b*) facing the movable element, and a mechanism portion (36, 41) configured to convert rotation of a motor (37) into linear movement of the electromagnet. The operation confirmation device includes: a position detector (109) configured to detect a position of the movable element; and a controller (7) configured to detect a failure of the motor based on a position detection signal from the position detector. The controller issues a command to rotate the motor during standby of the electric actuator, and then detects the failure of the motor based on the position detection signal.

8 Claims, 5 Drawing Sheets

(56) References Cited

U.S. PATENT DOCUMENTS

| | | | | |
|---|---|---|---|---|
| 12,687,856 | B1 * | 7/2026 | Gayaka | G05D 1/246 |
| 2007/0225890 | A1 * | 9/2007 | Ringlstetter | B60T 13/66<br>188/161 |
| 2012/0000731 | A1 | 1/2012 | Schienda et al. | |
| 2022/0017331 | A1 * | 1/2022 | Saito | B66B 1/3446 |
| 2024/0426947 | A1 * | 12/2024 | Saito | B66B 5/16 |
| 2025/0136411 | A1 * | 5/2025 | Saito | B66B 5/04 |

FOREIGN PATENT DOCUMENTS

| | | | |
|---|---|---|---|
| JP | 2011-241018 | A | 12/2011 |
| JP | 2012-520809 | A | 9/2012 |
| JP | 2021-42013 | A | 3/2021 |
| JP | 2021-130550 | A | 9/2021 |
| WO | WO 2020/110316 | A1 | 6/2020 |
| WO | WO 2021/166144 | A1 | 8/2021 |

OTHER PUBLICATIONS

Japanese-language Written Opinion (PCT/ISA/237) issued in PCT Application No. PCT/JP2021/037199 dated Dec. 14, 2021 with English translation (6 pages).

* cited by examiner

[FIG. 1]
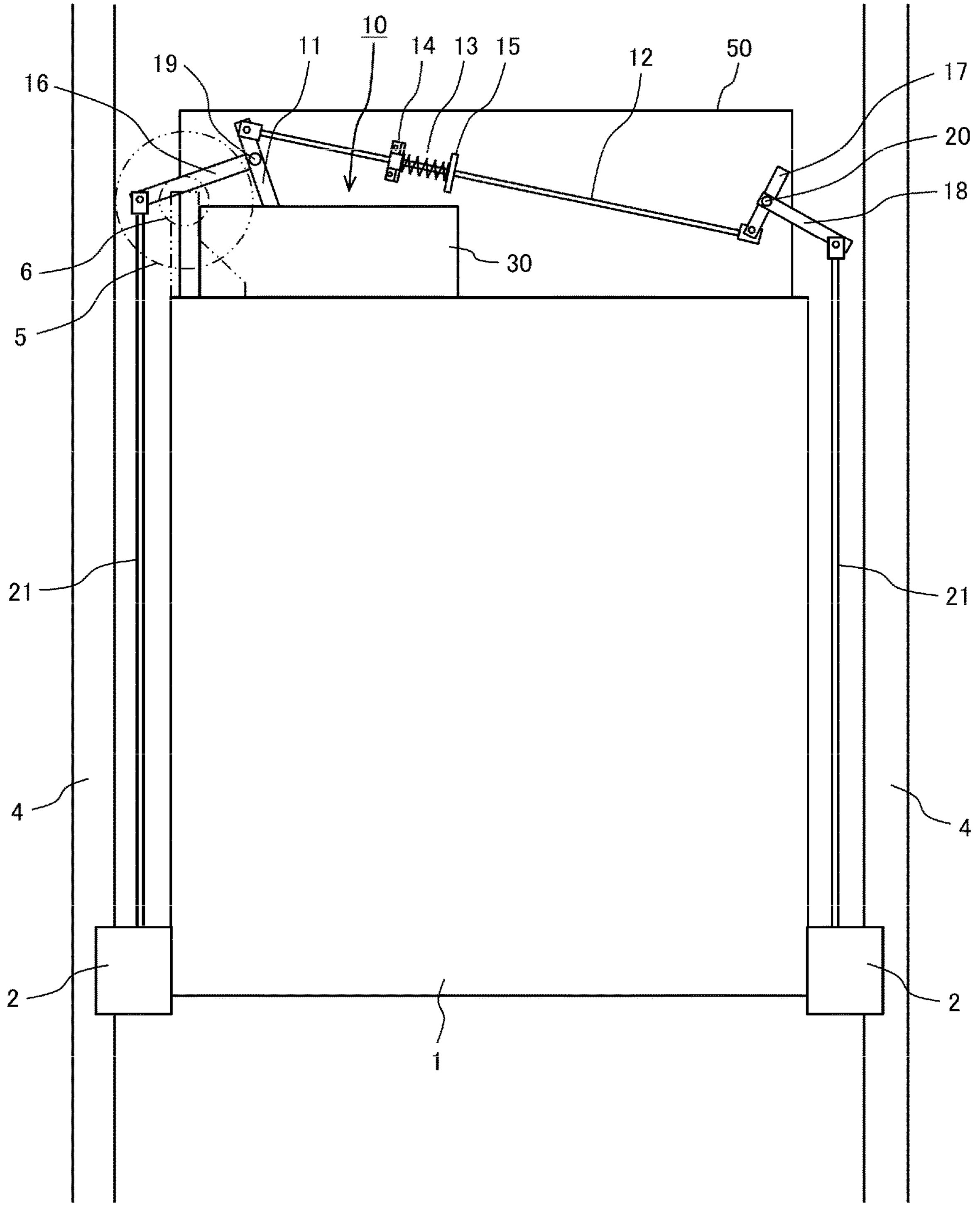

[FIG. 2]
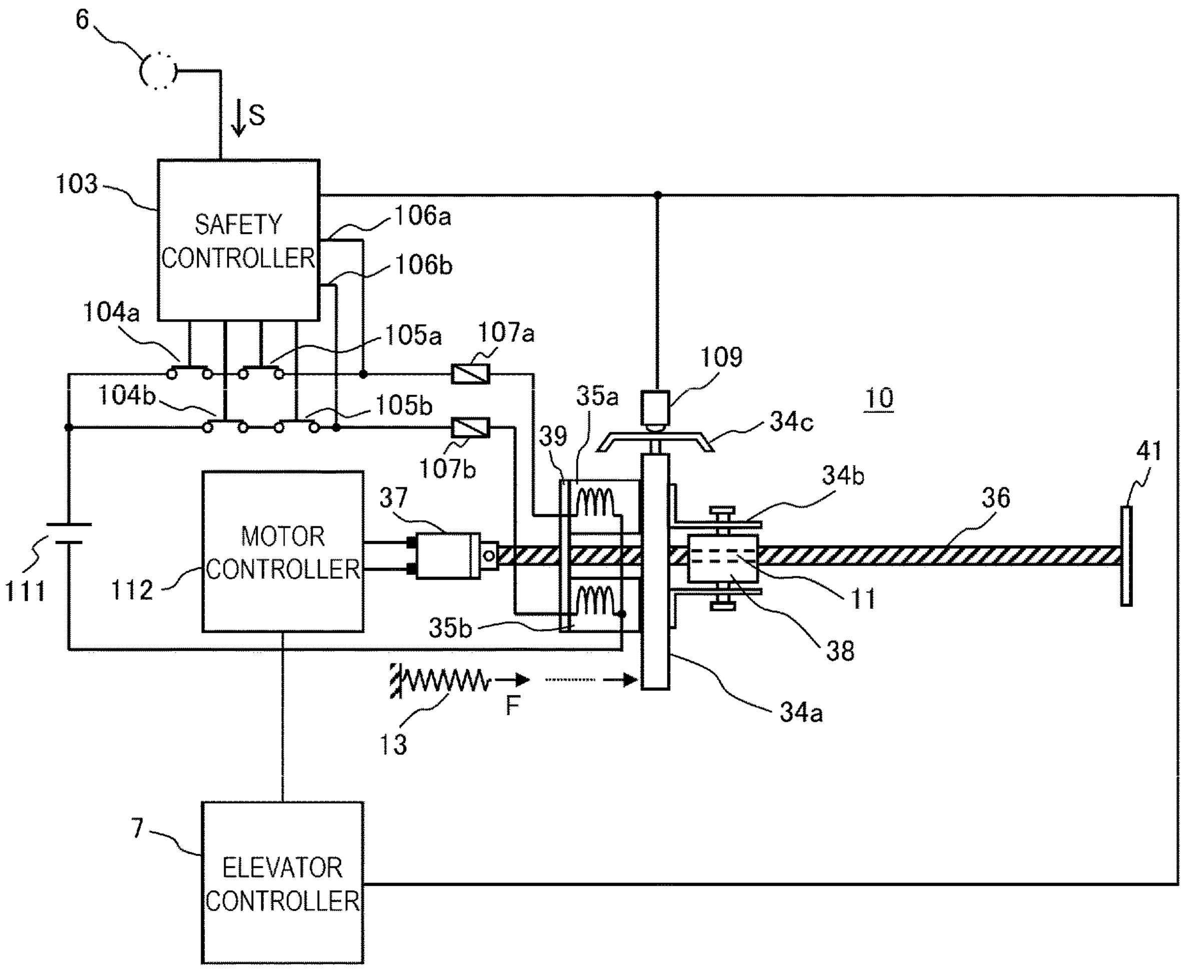

[FIG. 3]
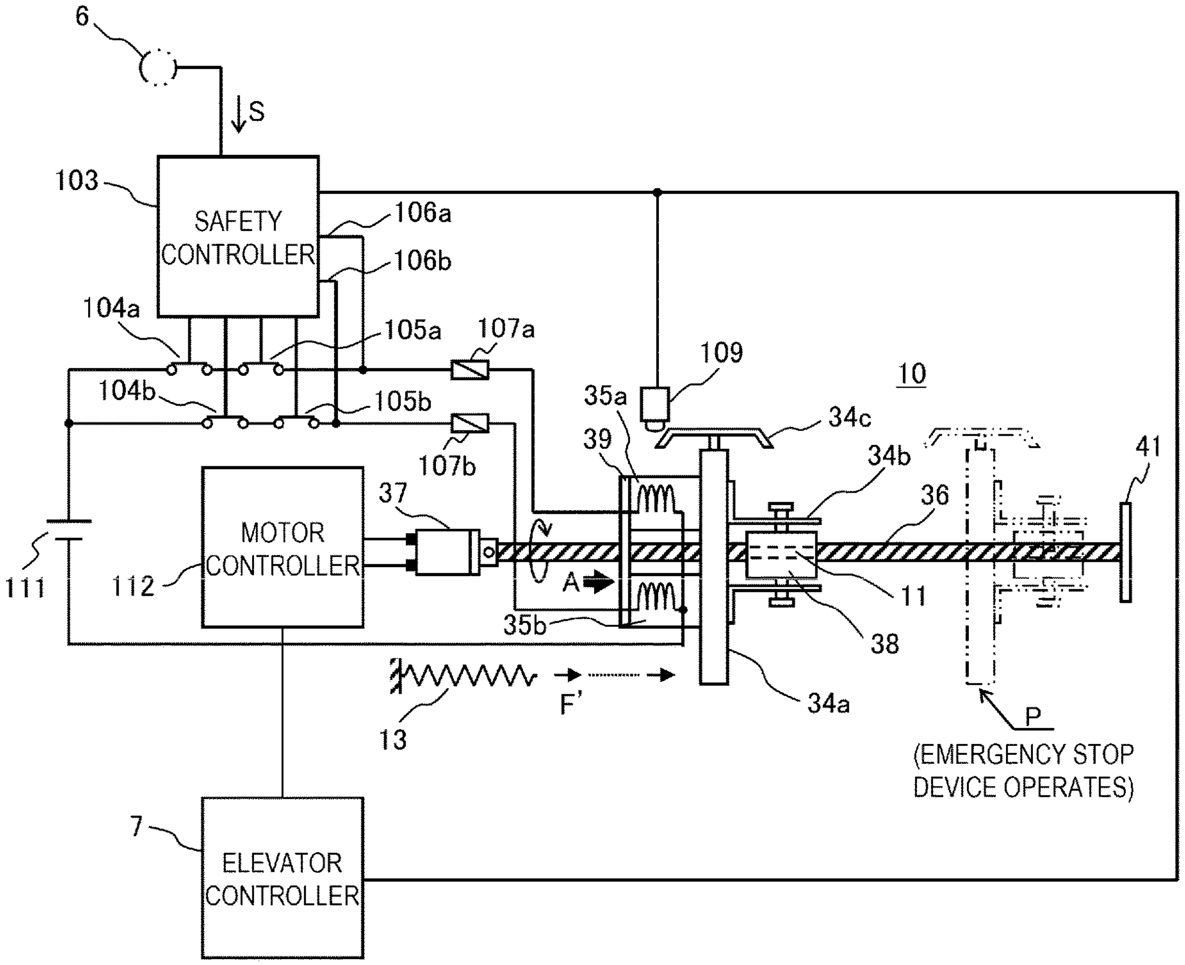

[FIG. 4]
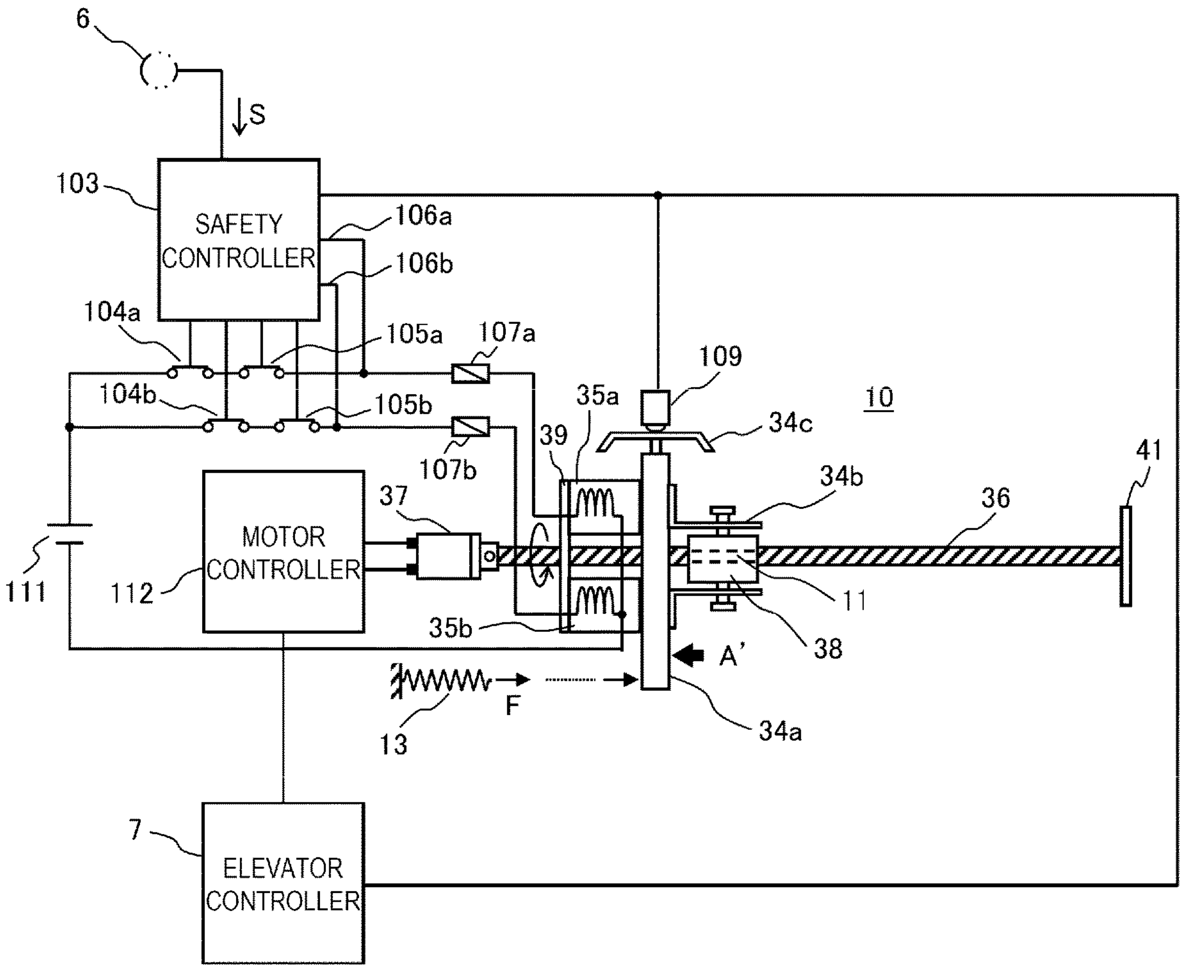

[FIG. 5]
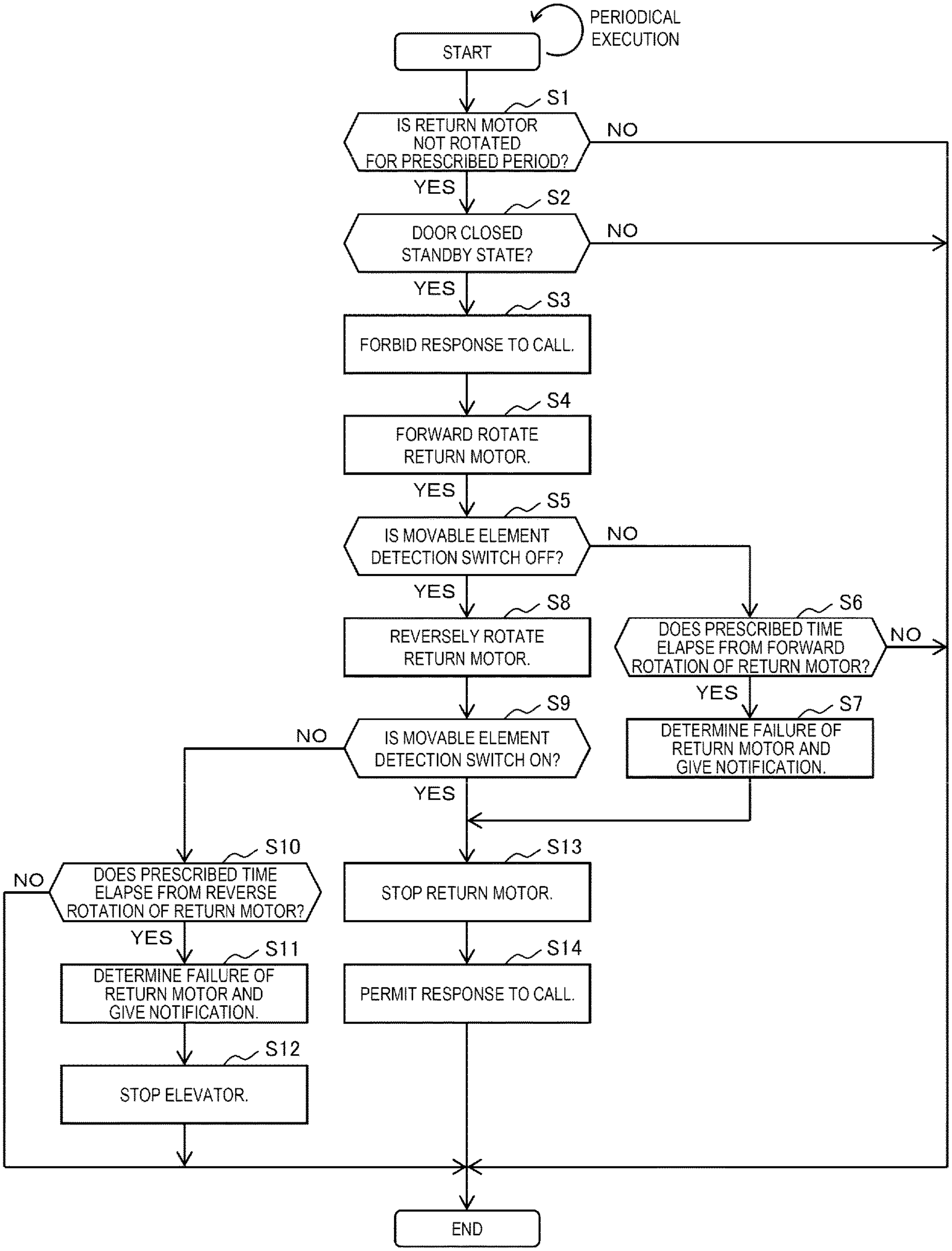

OPERATION CONFIRMATION DEVICE AND OPERATION CONFIRMATION METHOD FOR ELECTRIC ACTUATOR FOR EMERGENCY STOP DEVICE

TECHNICAL FIELD

The present invention relates to an operation confirmation device and an operation confirmation method for an electric actuator that actuates a drive mechanism that drives an elevator emergency stop device.

BACKGROUND ART

An elevator device includes a governor and an emergency stop device to constantly monitor an elevating speed of a car and emergency-stop the car in a prescribed overspeed state. Generally, the car and the governor are coupled by a governor rope. When the overspeed state is detected, the governor restricts the governor rope to operate the emergency stop device on a car side and emergency-stop the car.

In such an elevator device, the governor rope, which is elongated, is laid in a hoistway, making it difficult to save space and reduce cost. Further, when the governor rope swings, a structure in the hoistway is likely to interfere with the governor rope.

Given this, an emergency stop device that operates electrically without a governor rope is proposed. A technique related to such an emergency stop device in the related art is described in Patent Literature 1.

In the related art, a car is provided with a drive shaft that drives an emergency stop device and an electric actuator that actuates the drive shaft. The electric actuator includes a movable iron core mechanically connected to the drive shaft, and an electromagnet that attracts the movable iron core. The drive shaft is urged by a drive spring, however, during normal times, movement of the drive shaft is restricted by the electric actuator since the electromagnet is energized and the movable iron core is attracted.

In an emergency, the electromagnet is demagnetized to release the restriction of the drive shaft, and the drive shaft is driven by an urging force of the drive spring. As a result, the emergency stop device operates and the car emergency-stops.

When the emergency stop device is returned to a normal state, the electromagnet is moved and brought close to the movable iron core moved in an emergency. The electromagnet includes a feed nut that screws onto a feed screw shaft. When the feed screw shaft is rotated by a motor, the electromagnet moves toward the movable iron core. When the electromagnet comes into contact with the movable iron core, the movable iron core is attracted to the electromagnet. In a state in which the movable iron core is attracted to the electromagnet, the electromagnet is moved to return the movable iron core and the electromagnet to a normal standby position.

CITATION LIST

Patent Literature

Patent Literature 1: JP2021-130550A

SUMMARY OF INVENTION

Technical Problem

In maintenance of the emergency stop device in the related art, it is necessary to check presence or absence of an abnormality, a deterioration state, and the like not only in a mechanical part such as a braking element (wedge) but also in an electric device portion such as the electromagnet and the motor provided in the electric actuator. For this reason, the emergency stop device that operates electrically has a problem of improving maintainability of the electric device portion.

In view of the above, the invention provides an operation confirmation device and an operation confirmation method for an electric actuator for an emergency stop device, which can improve maintainability of an electric device portion.

Solution to Problem

To solve the above problem, there is provided an operation confirmation device for confirming operation of an electric actuator for an emergency stop device according to the invention, the electric actuator configured to actuate a drive mechanism that drives an elevator emergency stop device and including a movable element mechanically connected to the drive mechanism, an electromagnet facing the movable element, and a mechanism portion configured to convert rotation of a motor into linear movement of the electromagnet, the operation confirmation device including: a position detector configured to detect a position of the movable element; and a controller configured to detect a failure of the motor based on a position detection signal from the position detector, in which the controller issues a command to rotate the motor during standby of the electric actuator, and then detects the failure of the motor based on the position detection signal.

To solve the above problem, there is provided an operation confirmation method for confirming operation of an electric actuator for an emergency stop device, the electric actuator configured to actuate a drive mechanism that drives an elevator emergency stop device and including a movable element mechanically connected to the drive mechanism, an electromagnet facing the movable element, and a mechanism portion configured to convert rotation of a motor into linear movement of the electromagnet, the operation confirmation method including:

- performing control to rotate the motor during standby of the electric actuator; and
- detecting a failure of the motor based on a position of the movable element.

Advantageous Effects of Invention

According to the invention, operation of a motor can be quickly and accurately confirmed. Accordingly, maintainability of an electric device portion in an emergency stop device that operates electrically is improved.

Problems, configurations, and effects other than those described above will become apparent in the following description of embodiments.

BRIEF DESCRIPTION OF DRAWINGS

FIG. 1 is a schematic configuration diagram of an elevator device according to an embodiment.

FIG. 2 is a plan view showing a mechanical part and an electric device portion of an electric actuator 10 (standby state).

FIG. 3 is a plan view of the electric actuator 10 showing an operation state of the electric actuator 10 when confirming operation of a motor 37.

FIG. 4 is a plan view of the electric actuator 10 showing the operation state of the electric actuator 10 when confirming operation of the motor 37 (operation state following the operation state in FIG. 3).

FIG. 5 is a flowchart showing a flow of a motor operation confirmation process according to the embodiment.

DESCRIPTION OF EMBODIMENTS

Hereinafter, an elevator device according to an embodiment of the invention will be described with reference to the drawings. In the drawings, components having the same reference numerals indicate the same components or components having similar functions.

FIG. 1 is a schematic configuration diagram of an elevator device according to the embodiment of the invention.

As shown in FIG. 1, the elevator device includes a car 1, a speed sensor (5 and 6), an electric actuator 10, a drive mechanism (12 to 20), pull-up rods 21, and emergency stop devices 2.

The car 1 is suspended by a main rope (not shown) in a hoistway provided in a building, and is slidably engaged with a guide rail 4 via a guide device. When the main rope is frictionally driven by a drive device (hoist: not shown), the car 1 is moved up and down in the hoistway.

The speed sensor in the present embodiment is provided on the car 1, and includes a rotary detector 6 and a roller 5 connected to a rotation shaft of the rotary detector 6. In the present embodiment, the roller 5 is connected to the rotation shaft of the rotary detector 6 such that a rotation shaft of the roller 5 and the rotation shaft of the rotary detector 6 are coaxial. For example, a rotary encoder can be applied as the rotary detector 6.

The roller 5 is in contact with the guide rail 4. For this reason, the roller 5 rotates when the car 1 moves up and down, and the rotary detector 6 rotates accordingly. A safety controller, which will be described later, monitors a traveling speed of the car 1 based on a rotational position signal output by the rotary detector 6 accompanying the rotation.

An image sensor may be used as the speed sensor. In this case, a position and a speed of the car 1 are detected based on image information on a surface state of the guide rail 4 acquired by the image sensor. For example, the speed is calculated from a movement distance of an image feature in prescribed time.

In the present embodiment, the electric actuator 10 is an electromagnetic operation device and is disposed on an upper portion of the car 1. The electromagnetic operation device includes, for example, a movable piece or a movable rod that operates by a solenoid or an electromagnet. The electric actuator 10 operates when the speed sensor (5, 6) detects a prescribed overspeed state of the car 1. At this time, the pull-up rod 21 is pulled up by the drive mechanism (12 to 20) mechanically connected to an operation lever 11. As a result, the emergency stop device 2 enters a braking state.

The drive mechanisms (12 to 20) will be described later.

One emergency stop device 2 is disposed on each of left and right sides of the car 1. A pair of braking elements (not shown) provided by each emergency stop device 2 are movable between a braking position and a non-braking position, and have the guide rail 4 sandwiched in the braking position. When the emergency stop device 2 moves up relative to the car 1 as the car 1 moves down, a braking force is generated by a frictional force acting between the braking elements and the guide rail 4. Accordingly, the emergency stop device 2 operates when the car 1 falls into an overspeed state, and emergency-stops the car 1.

The elevator device in the present embodiment includes a so-called low-press governor system that does not use a governor rope. When an elevating speed of the car 1 exceeds a rated speed and reaches a first overspeed (for example, a speed that does not exceed 1.3 times the rated speed), a power supply of the drive device (hoist) and a power supply of a control device that controls the drive device are cut off. When a descending speed of the car 1 reaches a second overspeed (for example, a speed that does not exceed 1.4 times the rated speed), the electric actuator 10 provided on the car 1 is electrically driven, the emergency stop device 2 is actuated, and the car 1 is emergency-stopped.

In the present embodiment, the low-press governor system includes the speed sensor (5, 6) and the safety controller that determines an overspeed state of the car 1 based on an output signal of the speed sensor. The safety controller measures the speed of the car 1 based on the output signal of the speed sensor. When determining that the measured speed reaches the first overspeed, the safety controller outputs a command signal for cutting off the power supply of the drive device (hoist) and the power supply of the control device that controls the drive device. When determining that the measured speed reaches the second overspeed, the safety controller outputs a command signal for actuating the electric actuator 10.

As described above, when the pair of braking elements provided in the emergency stop device 2 are pulled up by the pull-up rod 21, the pair of braking elements have the guide rail 4 sandwiched in between. The pull-up rod 21 is driven by the drive mechanism (12 to 20) connected to the electric actuator 10.

Hereinafter, a configuration of the drive mechanism will be described.

The operation lever 11 of the electric actuator 10 is coupled to a first actuating piece 16 to form substantially T-shaped first link member. The operation lever 11 and the first actuating piece 16 respectively constitute a head portion and a foot portion of a T shape. The substantially T-shaped first link member is pivotably supported to a crosshead 50 via a first actuating shaft 19 at a coupling portion between the operation lever 11 and the first actuating piece 16. One of a pair of pull-up rods 21 (on a left side in the drawing) has an end portion connected to an end portion of the first actuating piece 16, which is the foot portion of the T shape, on a side opposite to the coupling portion between the operation lever 11 and the first actuating piece 16.

A connection piece 17 is coupled to a second actuating piece 18 to form a substantially T-shaped second link member. The connection piece 17 and the second actuating piece 18 respectively constitute a head portion and a foot portion of a T shape. The substantially T-shaped second link member is pivotably supported to the crosshead 50 via a second actuating shaft 20 at a coupling portion between the connection piece 17 and the second actuating piece 18. The other one of the pair of pull-up rods 21 (on a left side in the drawing) has an end portion connected to an end portion of the second actuating piece 18, which is the foot portion of the T shape, on a side opposite to the coupling portion between the connection piece 17 and the second actuating piece 18.

An end portion of the operation lever 11 that extends from inside to outside of a case 30 and one of two end portions of the connection piece 17 that is closer to the upper portion of the car 1 than the second actuating shaft 20 are respectively connected to one end (on the left side in the drawing) and the other end (on the right side in the drawing) of a drive shaft 12 lying across the car 1. The drive shaft 12 slidably penetrates a fixed portion 14 fixed to the crosshead 50. The drive shaft 12 further penetrates a pressing member 15. The pressing member 15 is fixed to the drive shaft 12. The pressing member 15 is located on a second link member (the connection piece 17 and the second actuating piece 18) side relative to the fixed portion 14. A drive spring 13, which is an elastic body, is located between the fixed portion 14 and the pressing member 15, and the drive shaft 12 is inserted through the drive spring 13.

When the electric actuator 10 operates, that is, when energization to an electromagnet in the present embodiment is cut off, an electromagnetic force that restricts movement of the operation lever 11 against an urging force of the drive spring 13 disappears. Accordingly, the drive shaft 12 is driven along a longitudinal direction by the urging force of the drive spring 13 applied to the pressing member 15. For this reason, the first link member (the operation lever 11 and the first actuating piece 16) pivots about the first actuating shaft 19, and the second link member (the connection piece 17 and the second actuating piece 18) pivots about the second actuating shaft 20. Accordingly, one pull-up rod 21 connected to the first actuating piece 16 of the first link member is driven and pulled up, and the other pull-up rod 21 connected to the second actuating piece 18 of the second link member is driven and pulled up at the same time.

FIG. 2 is a plan view showing a mechanical part and an electric device portion of the electric actuator 10 in the present embodiment in an installed state of FIG. 1. The electric actuator 10 shown in FIG. 2 is stored in the case 30 in FIG. 1 (the same applies to FIGS. 3 and 4).

FIG. 2 also shows a circuit configuration for controlling the electric device portion (the same applies to FIGS. 3 and 4). In FIG. 2, the emergency stop device 2 (FIG. 1) is in a non-braking state, and the electric actuator 10 is in a standby state. That is, the elevator device is in a normal operation state.

As shown in FIG. 2, in the standby state, a movable element (34*a*, 34*b*, 34*c*), which is a movable member connected to the operation lever 11, is attracted by electromagnetic forces to electromagnets 35*a* and 35*b* whose coils are energized and excited. Accordingly, movement of the movable element is restricted against an urging force F of the drive spring 13 (FIG. 1) acting on the movable element via the drive shaft 12 (FIG. 1) and the operation lever 11. Accordingly, the electric actuator 10 restricts movement of the drive mechanism (12 to 20: FIG. 1) against the urging force of the drive spring 13.

The movable element includes an attraction portion 34*a* that is attracted to pole surfaces of the electromagnets 35*a* and 35*b* and a support portion 34*b* that is fixed to the attraction portion 34*a* and to which the operation lever 11 is connected. The operation lever 11 is pivotably connected to the support portion 34*b* of the movable element via a connection bracket 38. The electric actuator 10 is provided with a movable element detection switch 109 in a position in which the attraction portion 34*a* of the movable element is located during standby.

The movable element further includes a cam portion 34*c* fixed to the attraction portion 34*a*. When the movable element is located in a standby position, the movable element detection switch 109 is operated by the cam portion 34*c*. When operated by the cam portion 34*c*, the movable element detection switch 109 transitions from an on state to an off state or from the off state to the on state. Accordingly, it is possible to detect whether the movable element is located in the standby position according to a state of the movable element detection switch 109. In the present embodiment, a safety controller 103 determines whether the movable element is located in the standby position based on the state of the movable element detection switch 109.

In the movable element (34*a*, 34*b*, 34*c*) according to the present embodiment, at least the attraction portion 34*a* is made of a magnetic material. Soft magnetic materials such as low-carbon steel and permalloy (iron-nickel alloy) are preferably used as the magnetic material.

Other components of a mechanism portion (36, 37, 39, 41) shown in FIG. 2 will be described later.

The electromagnets 35*a* and 35*b* are excited by a DC power supply 111. In an excitation circuit of the electromagnet 35*a*, one end of the coil of the electromagnet 35*a* is connected to a high potential side of the DC power supply 111 via electrical contacts 104*a*, 105*a* and a fuse 107*a* connected in series, and the other end of the coil of the electromagnet 35*a* is connected to a low potential side of the DC power supply 111. In an excitation circuit of the electromagnet 35*b*, one end of the coil of the electromagnet 35*b* is connected to the high potential side of the DC power supply 111 via electrical contacts 104*b*, 105*a* and a fuse 107*b* connected in series, and the other end of the coil of the electromagnet 35*b* is connected to the low potential side of the DC power supply 111.

The fuses 107*a*, 107*b* are each provided in the excitation circuit to protect the electromagnets 35*a* and 35*b* from an overcurrent.

The electrical contacts 104*a*, 105*a*, 104*b*, and 105*b* are controlled to be on and off by the safety controller 103. In the standby state of the electric actuator 10, the safety controller 103 controls each of the electrical contacts 104*a*, 105*a*, 104*b*, and 105*b* to be in the on state. When the coils of the electromagnets 35*a* and 35*b* are energized, the electromagnets 35*a* and 35*b* generate electromagnetic forces.

Each of the electrical contacts 104*a*, 105*a*, 104*b*, and 105*b* is configured with a contact provided in, for example, an electromagnetic relay, an electromagnetic contactor, and an electromagnetic switch. In each excitation circuit of the electromagnets 35*a* and 35*b*, a plurality of (two in FIG. 2) electrical contacts are connected in series. Accordingly, even if an on failure occurs in one contact when the plurality of electrical contacts are controlled to be in the off state to actuate the emergency stop device 2 as to be described later, the energization of the electromagnet is cut off. Accordingly, operation reliability of the electric actuator 10 is improved. The on failure occurs due to, for example, welding of a contact.

Other components of the electric device portion (37, 112) will be described later (FIGS. 3 and 4). Signal lines 106*a* and 106*b* are used to input answer back signals from the excitation circuits of the electromagnets 35*a* and 35*b* to the safety controller 103.

The answer back signal (hereinafter referred to as "answer back signal (106*a*)") input to the safety controller 103 via the signal line 106*a* indicates a potential of one of two ends of the coil of the electromagnet 35*a* which is connected to the high potential side of the DC power supply 111 via the electrical contacts 104*a* and 105*a*. Accordingly, the answer back signal (106*a*) indicates a potential (high potential (HIGH)) on the high potential side of the DC power supply 111 when the electromagnet 35*a* is energized, and indicates a potential (low potential (LOW)) on the low potential side of the DC power supply 111 when the electromagnet 35*a* is not energized. The safety controller 103 detects an energization state of the electromagnet 35*a* based on the potential indicated by the answer back signal (106*a*).

The answer back signal (hereinafter referred to as "answer back signal (106*b*)") input to the safety controller 103 via the signal line 106*b* indicates a potential of one of two ends of the coil of the electromagnet 35*b* which is connected to the high potential side of the DC power supply 111 via the electrical contacts 104*b* and 105*b*. Accordingly, the answer back signal (106*b*) indicates a potential (high potential (HIGH)) on the high potential side of the DC power supply 111 when the electromagnet 35*b* is energized, and indicates a potential (low potential (LOW)) on the low potential side of the DC power supply 111 when the electromagnet 35*b* is not energized. The safety controller 103 detects an energization state of the electromagnet 35*b* based on the potential indicated by the answer back signal (106*b*).

Next, operation of the electric actuator 10 when the emergency stop device 2 operates will be described.

When detecting a prescribed overspeed state (the above-described second overspeed) of the car 1 based on the rotational position signal from the rotary detector 6, the safety controller 103 outputs an off command to each of the electrical contacts 104*a*, 105*a*, 104*b*, and 105*b*. In response to the off command, the electrical contacts 104*a*, 105*a*, 104*b*, and 105*b* transition from the on state (FIG. 2) to the off state. For this reason, the excitation of the electromagnets 35*a* and 35*b* is stopped, and thus the electromagnetic forces acting on the movable element (34*a*, 34*b*, 34*c*) disappear. Accordingly, the restriction on the movable element by the attraction of the attraction portion 34*a* of the movable element to the electromagnets 35*a* and 35*b* is released, and thus the movable element moves in a direction (rightward direction in the drawing) of the urging force of the drive spring 13 from a position (FIG. 2) in the standby state by the urging force (F in FIG. 2) of the drive spring 13.

As the restriction on the movable element is released, the drive shaft 12 is driven by the urging force of the drive spring 13 (FIG. 1) acting on the pressing member 15 (FIG. 1) of the drive shaft 12 in a direction from the fixed portion 14 (FIG. 1) toward the pressing member (FIG. 1). When the drive shaft 12 is driven, the first link member (the operation lever 11 and the first actuating piece 16: FIG. 1) connected to the drive shaft 12 pivots about the first actuating shaft 19 (FIG. 1). Accordingly, the pull-up rod 21 (FIG. 1) connected to the first actuating piece 16 is pulled up. When the drive shaft 12 is driven, the second link member (the connection piece 17 and the second actuating piece 18: FIG. 1) connected to the drive shaft 12 pivots about the second actuating shaft 20 (FIG. 1). Accordingly, the pull-up rod 21 (FIG. 1) connected to the second actuating piece 18 is pulled up.

Next, return operation of the electric actuator 10 will be described.

To return the electric actuator 10 to the standby state as shown in FIG. 2 from an actuated state, as described below, the movable element (34*a*, 34*b*, 34*c*) is returned from a movement position (a position P in FIG. 3) to the standby position (FIG. 2) by the mechanism portion (36, 37, 39, and 41) and the electric device portion (37 and 112) which are not described in FIG. 2.

The electric actuator 10 includes a feed screw 36 that drives the movable element. The feed screw 36 is coaxially connected to a rotation shaft of a motor 37 and is rotatably supported by a support member 41. The electromagnets 35*a* and 35*b* are fixed to an electromagnet support plate 39 including a feed nut portion (not shown). The feed nut portion of the electromagnet support plate 39 is screwed with the feed screw 36. The feed screw 36 is rotated by the motor 37. The motor 37 is driven by a motor controller 112.

The motor controller 112 includes a drive circuit for the motor 37, and controls rotation of the motor 37 in accordance with a control command from an elevator controller 7. The motor 37 may be either a DC motor or an AC motor.

The elevator controller 7 controls normal operation of the car 1 and has information on an operation state of the car 1. In the present embodiment, as described above, the elevator controller 7 further has a function of controlling the motor 37 provided in the electric actuator 10 and a function of confirming operation of the motor 37.

When returning the electric actuator 10 to the standby state, the elevator controller 7 sends a rotation command of the motor 37 to the motor controller 112. Upon receiving the rotation command, the motor controller 112 drives the motor 37 and rotates the feed screw 36. The rotation of the motor 37 is converted into linear movement of the electromagnets 35*a* and 35*b* along an axial direction of the feed screw 36 by the rotating feed screw 36 and the feed nut portion of the electromagnet support plate 39. Accordingly, the electromagnets 35*a* and 35*b* approach the movement position P of the movable element (34*a*, 34*b*, 34*c*) shown in FIG. 3, and come into contact with the movable element.

The motor controller 112 monitors a motor current for controlling the motor 37. When the electromagnets 35*a* and 35*b* come into contact with the movable element as described above, a load of the motor 37 increases, and the motor current accordingly increases. When the motor current increases and exceeds a prescribed value, the motor controller 112 determines that the electromagnets 35*a* and 35*b* come into contact with the movable element. The motor controller 112 sends a determination result to the safety controller 103 and the elevator controller 7.

Upon receiving the determination result from the motor controller 112, the safety controller 103 outputs an on command to each of the electrical contacts 104*a*, 105*a*, 104*b*, and 105*b*. In response to the on command, the electrical contacts 104*a*, 105*a*, 104*b*, and 105*b* transition from the off state to the on state. For this reason, the electromagnets 35*a* and 35*b* are excited. The attraction portion 34*a* of the movable element is attracted to the electromagnets 35*a* and 35*b* by the electromagnetic forces of the excited electromagnets 35*a* and 35*b*.

Upon receiving the determination result from the motor controller 112, the elevator controller 7 sends a reverse rotation command of the motor 37 to the motor controller 112. Upon receiving the reverse rotation command, the motor controller 112 reverses a rotation direction of the motor 37 and rotates the feed screw 36 in a reverse direction. Accordingly, the movable element attracted to the electromagnets 35*a* and 35*b* receives an urging force of the drive spring 13, and moves toward the standby position (FIG. 2) together with the electromagnets 35*a* and 35*b*.

When the movable element reaches the standby position, the movable element detection switch 109 is operated by the cam portion 34*c* of the movable element. When the movable element detection switch 109 is operated, the elevator controller 7 determines that the movable element is located in the standby position. The elevator controller 7 sends a stop command of the motor 37 to the motor controller 112 based on this determination result. Upon receiving the stop command, the motor controller 112 stops the rotation of the motor 37.

An output capacity of the motor 37 is set in consideration of a frictional force between the feed screw 36 and the feed nut portion caused by weights of the electromagnets 35*a* and 35*b* and the movable element, and the urging force of the drive spring 13.

In the present embodiment, each of the electromagnets 35*a* and 35*b* has an electromagnetic force sufficient to restrict the movement of the movable element against the urging force of the drive spring 13 even by one of the electromagnets 35*a* and 35*b*. Accordingly, even if one of the electromagnets 35*a* and 35*b* fails, the operation of the emergency stop device 2 can be maintained. This improves reliability of the operation of the electric actuator 10.

Next, a method for confirming the operation of the motor 37 provided in the electric actuator 10 will be described.

FIG. 3 is a plan view of the electric actuator 10, similar to FIG. 2, showing the operation state of the electric actuator 10 when confirming the operation of the motor 37.

When confirming the operation of the motor 37, the elevator controller 7 sends a rotation command of the motor 37 to the motor controller 112 in the standby state (FIG. 2) to rotate (forward rotate) the motor 37.

Since the electromagnets 35*a* and 35*b* are in the standby state, the electromagnets 35*a* and 35*b* are energized and attract the movable element (34*a*, 34*b*, 34*c*). Accordingly, if the motor 37 normally rotates, the movable element (34*a*, 34*b*, 34*c*) moves in an A direction shown in the drawing together with the electromagnets 35*a* and 35*b*. For this reason, the operation of the movable element detection switch 109 by the cam portion 34*c* is released, and thus the on and off state of the movable element detection switch 109 transitions from the standby state (the on state in the present embodiment) to a state (the off state in the present embodiment) when the movable element detection switch 109 is not operated by the cam portion 34*c*.

The elevator controller 7 detects the on and off state of the movable element detection switch 109 and determines presence and absence of an abnormality of the motor 37 based on the detected on and off state.

In the present embodiment, the elevator controller 7 detects the on and off state of the movable element detection switch 109 after sending the rotation command of the motor 37. When the movable element detection switch 109 remains in the on state and does not transition to the off state even after prescribed time elapses after the rotation command is sent, the elevator controller 7 determines a failure of the motor 37. Here, the prescribed time is set to be time required for the cam portion 34*c* to separate from the movable element detection switch 109 when the motor 37 is normal. The prescribed time is set to be shorter than time required for the movable element to move to the position P in which the emergency stop device 2 operates when the motor 37 is normal.

In this manner, the movable element is attracted to the electromagnets 35*a* and 35*b* and the motor 37 is rotated (forward rotated), so that the movement of the movable element from the standby position is detected and the failure of the motor 37 is determined. Since the movable element is attracted to the electromagnets 35*a* and 35*b*, a load corresponding to an output in the normal state is applied to the motor 37. Accordingly, the failure of the motor 37 can be determined with high reliability.

Instead of the movable element detection switch 109, another position detection sensor, for example, a photoelectric position sensor, a magnetic position sensor, or a proximity sensor (capacitive or inductive) may be applied.

FIG. 4 is a plan view of the electric actuator 10, similar to FIG. 2, showing the operation state of the electric actuator 10 when confirming the operation of the motor 37. FIG. 4 shows the operation state following the operation state of the electric actuator 10 in FIG. 3.

When rotating (forward rotating) the motor 37 as described above (FIG. 3) and determining no failure in the motor 37, the elevator controller 7 updates the rotation command of the motor 37 sent to the motor controller 112 and rotates the motor 37 in the reverse direction. Accordingly, the movable element (34*a*, 34*b*, 34*c*) and the electromagnets 35*a* and 35*b* are moved to the standby position.

If the motor 37 normally rotates (reversely rotates), the movable element (34*a*, 34*b*, 34*c*) moves in an A' direction shown in the drawing together with the electromagnets 35*a*, 35*b* and returns to the standby position (FIG. 2). For this reason, the movable element detection switch 109 is operated by the cam portion 34*c*, and thus the on and off state of the movable element detection switch 109 transitions from the state (the off state in the present embodiment) when the movable element detection switch 109 is not operated by the cam portion 34*c* to the standby state (the on state in the present embodiment).

The elevator controller 7 detects the on and off state of the movable element detection switch 109 and determines presence and absence of an abnormality of the motor 37 based on the detected on and off state.

In the present embodiment, the elevator controller 7 detects the on and off state of the movable element detection switch 109 after updating the rotation command of the motor 37. When the movable element detection switch 109 remains in the off state and does not transition to the on state even after prescribed time elapses after the rotation command is updated, the elevator controller 7 determines a failure of the motor 37. Here, the prescribed time is set to be time required for the movable element to return to the standby position and the movable element detection switch 109 to be operated by the cam portion 34*c* after the rotation command is updated when the motor 37 is normal. In the present embodiment, the time is set to be the same time value as the prescribed time in the case of FIG. 3 described above.

In this manner, the movable element is attracted to the electromagnets 35*a* and 35*b* and the motor 37 is rotated (reversely rotated), so that the movement of the movable element to the standby position is detected and the failure of the motor 37 is determined. Since the movable element is attracted to the electromagnets 35*a* and 35*b*, a load corresponding to an output in the normal state is applied to the motor 37. Accordingly, the failure of the motor 37 can be determined with high reliability. Further, the failure of the motor 37 can n be determined with high reliability by rotating the motor 37 in two directions and confirming the operation of the motor 37.

In the present embodiment as described above, the movable element detection switch 109 is used when returning the electric actuator 10 from the actuated state to the standby state and when confirming the operation of the motor 37. Accordingly, the elevator controller 7 can have a function of confirming the operation of the motor 37 without additionally providing a position detection sensor.

FIG. 5 is a flowchart showing a flow of an operation confirmation process for the motor 37 according to the present embodiment.

The operation confirmation process according to the present embodiment is mainly executed by the elevator controller 7 (FIG. 2). In the present embodiment, the elevator controller 7 executes the operation confirmation process by executing a prescribed program by a computer system such as a microcomputer.

Hereinafter, FIG. 5 will be described with reference to FIG. 2 as appropriate. The operation confirmation process shown in FIG. 5 is periodically executed. At a start of the process, the electric actuator 10 is in the standby state (FIG. 2).

In FIG. 5, the motor 37 is referred to as a return motor.

When the process is started, the elevator controller 7 first determines in step S1 whether the return motor (the motor 37) is not rotated for a prescribed period. Here, the prescribed period is set to be a time interval at which the elevator controller 7 confirms the operation of the return motor, and for example, one day (24 hours).

The elevator controller 7 includes a clock unit, measures time elapsed without rotation of the return motor, that is, time elapsed without the operation confirmation of the return motor, by the clock unit, and determines whether a measured value is the prescribed period or more.

When determining that the return motor is not rotated for the prescribed period (YES in step S1), the elevator controller 7 executes step S2. When determining that the return motor is rotated in the prescribed period (NO in step S1), the elevator controller 7 ends a series of processes and executes the series of processes from step S1 again.

In step S2, the elevator controller 7 determines whether the car 1 is stopped in a door closed state, that is, whether the car 1 is in a door closed standby state, based on data relating to the operation state of the car 1 provided in the elevator controller 7. When determining that the door is in the door closed standby state (YES in step S2), the elevator controller 7 executes step S3. When determining that the door is not in the door closed standby state (NO in step S2), the elevator controller 7 ends the series of processes, and executes the series of processes from step S1 again.

In step S3, the elevator controller 7 forbids the car 1 from responding to a hall call. Accordingly, the operation of the return motor can be confirmed in a state in which the car 1 is stopped and there is no passenger. After executing step S3, the elevator controller 7 executes step S4.

In step S4, the elevator controller 7 sends a rotation command to the motor controller 112 to forward rotate the return motor. After executing step S4, the elevator controller 7 executes step S5.

In step S5, the elevator controller 7 determines whether the movable element detection switch 109 transitions from the on state (standby state) to the off state. When determining that the movable element detection switch 109 transitions to the off state (YES in step S5), the elevator controller 7 executes step S8. When determining that the movable element detection switch 109 does not transition to the off state and remains in the on state (NO in step S5), the elevator controller 7 executes step S6.

In step S6, the elevator controller 7 determines whether prescribed time elapses from the forward rotation of the return motor in step S4. The prescribed time is set to be time (for example, about certain seconds) required for the cam portion 34*c* to separate from the movable element detection switch 109 and the movable element detection switch 109 to transition to the off state when the return motor is normal.

When determining that the prescribed time elapses (YES in step S6), the elevator controller 7 executes step S7. When determining that the prescribed time does not elapse (NO in step S6), the elevator controller 7 ends the series of processes and executes the series of processes from step S1 again.

In step S7, the elevator controller 7 determines a failure of the return motor. Further, the elevator controller 7 notifies outside (a maintenance worker or the like) of the failure of the return motor. The elevator controller 7 has a function of notifying an abnormality to the outside not only during a failure of the return motor but also during an abnormality occurred in the operation state of the elevator.

After executing step S7, the elevator controller 7 executes step S13.

In step S8, the elevator controller 7 updates the rotation command to the motor controller 112, that is, sends the reverse rotation command to rotate the return motor in the reverse direction. After executing step S8, the elevator controller 7 executes step S9. At a time point of executing step S8, the elevator controller 7 determines that the movable element detection switch 109 transitions to the off state. That is, the elevator controller 7 determines that the forward rotation operation of the return motor is normal. For this reason, the elevator controller 7 confirms the reverse rotation operation of the return motor in step S8 and subsequent steps.

After executing step S8, the elevator controller 7 executes step S9.

In step S9, the elevator controller 7 determines whether the movable element detection switch 109 transitions from the off state to the on state. When determining that the movable element detection switch 109 transitions to the on state (YES in step S9), the elevator controller 7 executes step S13. When determining that the movable element detection switch 109 does not transition to the on state and remains in the off state (NO in step S9), the elevator controller 7 executes step S10.

In step S10, the elevator controller 7 determines whether prescribed time elapses from the reverse rotation of the return motor in step S8. The prescribed time is set to be time (for example, about certain seconds) required for the movable element to return to the standby position, the movable element detection switch 109 to be operated by the cam portion 34*c*, and the movable element detection switch 109 to transition to the on state when the return motor is normal. In the present embodiment, the prescribed time in step S6 and the prescribed time in step S10 are set to be the same time value.

When determining that the prescribed time elapses (YES in step S10), the elevator controller 7 executes step S11. When determining that the prescribed time does not elapse (NO in step S10), the elevator controller 7 ends the series of processes and executes the series of processes from step S1 again.

In step S10, the elevator controller 7 determines a failure of the return motor. Further, the elevator controller 7 notifies the outside (a maintenance worker or the like) of the failure of the return motor. After executing step S11, the elevator controller 7 executes step S12.

In step S12, the elevator controller 7 stops the elevator device. After executing step S12, the elevator controller 7 ends the series of processes, and keeps the elevator device in a stop state until maintenance work ends.

In step S13, the elevator controller 7 stops the reverse rotation of the return motor. Accordingly, the electric actuator 10 enters the standby state (FIG. 2). After executing step S13, the elevator controller 7 executes step S14.

In step S14, the elevator controller 7 permits the car 1 to respond to the hall call. Accordingly, the car 1 is in the normal state. After executing step S14, the elevator controller 7 ends the series of processes, and executes the series of processes from step S1 again.

The invention is not limited to the above-described embodiment, and includes various modifications. For example, the embodiment described above is described in detail to facilitate understanding of the invention, and the invention is not necessarily limited to those including all configurations described above. Other configuration can be added to, deleted from, or replace a part of the configurations of the embodiment.

For example, the electric actuator 10 may be provided at a lower portion or a side portion in addition to the upper portion of the car 1.

The elevator device may further include a machine room or may be a so-called machine room-less elevator having no machine room.

REFERENCE SIGNS LIST

1: car
2: emergency stop device
3: position sensor
4: guide rail
5: roller
6: rotary detector
7: elevator controller
10: electric actuator
11: operation lever
12: drive shaft
13: drive spring
14: fixed portion
15: pressing member
16: first actuating piece
17: connection piece
18: second actuating piece
19: first actuating shaft
20: second actuating shaft
21: pull-up rod
30: case
34*a*: attraction portion
34*b*: support portion
34*c*: cam portion
35*a*, 35*b*: electromagnet
36: feed screw
37: motor
38: connection bracket
39: electromagnet support plate
41: support member
50: crosshead
103: safety controller
104*a*, 105*a*, 104*b*, 105*b*: electrical contact
106*a*, 106*b*: signal line
107*a*, 107*b*: fuse
109: movable element detection switch
111: DC power supply
112: motor controller

The invention claimed is:

1. An operation confirmation device for confirming operation of an electric actuator for an emergency stop device, the electric actuator configured to actuate a drive mechanism that drives an elevator emergency stop device and including a movable element mechanically connected to the drive mechanism, an electromagnet facing the movable element, and a mechanism portion configured to convert rotation of a motor into linear movement of the electromagnet, the operation confirmation device comprising:

a position detector configured to detect a position of the movable element; and a controller configured to detect a failure of the motor based on a position detection signal from the position detector, wherein the controller issues a command to rotate the motor during standby of the electric actuator, and then detects the failure of the motor based on the position detection signal.

2. The operation confirmation device for the electric actuator for the emergency stop device according to claim 1, wherein the movable element is attracted to the electromagnet during standby.

3. The operation confirmation device for the electric actuator for the emergency stop device according to claim 1, wherein when determining that the movable element is located in a standby position based on the position detection signal, the controller determines the failure of the motor.

4. The operation confirmation device for the electric actuator for the emergency stop device according to claim 1, wherein when determining that the movable element moves from a standby position based on the position detection signal, the controller issues a command to reversely rotate the motor and then detects the failure of the motor based on the position detection signal.

5. The operation confirmation device for the electric actuator for the emergency stop device according to claim 3, wherein the position detector is provided in the standby position of the movable element.

6. The operation confirmation device for the electric actuator for the emergency stop device according to claim 5, wherein the position detector includes a position detection switch, and the position detection switch is operated by a cam portion of the movable element.

7. An operation confirmation method for confirming operation of an electric actuator for an emergency stop device, the electric actuator configured to actuate a drive mechanism that drives an elevator emergency stop device and including a movable element mechanically connected to the drive mechanism, an electromagnet facing the movable element, and a mechanism portion configured to convert rotation of a motor into linear movement of the electromagnet, the operation confirmation method comprising:

performing control to rotate the motor during standby of the electric actuator; and detecting a failure of the motor based on a position of the movable element.

8. The operation confirmation method for the electric actuator for the emergency stop device according to claim 7, wherein when the movable element is located in a standby position, the failure of the motor is determined.

* * * * *